(12) United States Patent
Pollard

(10) Patent No.: US 11,217,212 B1
(45) Date of Patent: Jan. 4, 2022

(54) AUTOMATED ENDPIN FOR UPRIGHT STRINGED INSTRUMENTS

(71) Applicant: Charles W. Pollard, Wartburg, TN (US)

(72) Inventor: Charles W. Pollard, Wartburg, TN (US)

( * ) Notice: Subject to any disclaimer, the term of this patent is extended or adjusted under 35 U.S.C. 154(b) by 0 days.

(21) Appl. No.: 17/396,198

(22) Filed: Aug. 6, 2021

(51) Int. Cl.
| | |
|---|---|
| *G10D 3/01* | (2020.01) |
| *G10D 1/02* | (2006.01) |
| *G05D 3/10* | (2006.01) |
| *H02J 7/00* | (2006.01) |
| *H02K 11/00* | (2016.01) |

(52) U.S. Cl.
CPC ............... *G10D 3/01* (2020.02); *G05D 3/10* (2013.01); *G10D 1/02* (2013.01); *H02J 7/0042* (2013.01); *H02K 11/0094* (2013.01)

(58) Field of Classification Search
CPC ............... G10D 3/01; G10D 1/02; G05D 3/10
See application file for complete search history.

(56) References Cited

U.S. PATENT DOCUMENTS

| | | | | |
|---|---|---|---|---|
| 6,998,523 B1 * | 2/2006 | DeVuono | ................. | G10D 3/01 84/280 |
| 7,342,160 B2 * | 3/2008 | Alberti | .................... | G10D 3/01 84/280 |
| 7,375,269 B2 * | 5/2008 | Perkins | .................... | G10D 3/01 84/327 |
| 9,858,903 B2 * | 1/2018 | DeVuono | ................. | H04R 1/08 |
| 10,204,602 B2 * | 2/2019 | Quercetani | ............. | G10D 3/01 |
| 10,629,171 B1 * | 4/2020 | Haines-Eitzen | ......... | G10D 3/01 |
| 10,885,886 B2 * | 1/2021 | Feldman | .................. | G10D 3/01 |
| 10,943,567 B2 * | 3/2021 | Wang | ....................... | G10D 3/01 |

* cited by examiner

*Primary Examiner* — Robert W Horn
(74) *Attorney, Agent, or Firm* — Pitts & Lake, P.C.

(57) ABSTRACT

Example embodiments of the present general inventive concept provide and automatic endpin extension system to be used with an upright instrument, the system including a housing portion configured to be passed through a bottom aperture of an upright instrument, a coupling portion configured to be connected to the housing portion and to be coupled to the upright instrument proximate the bottom aperture, a telescoping endpin portion configured to be selectively moved up and down to extend out from, and withdraw into, the housing portion, a motor portion connected to the housing portion and configured to selectively drive the telescoping endpin portion up and down, and a controller portion configured to control the motor portion.

20 Claims, 6 Drawing Sheets

AUTOMATED ENDPIN FOR UPRIGHT STRINGED INSTRUMENTS

CROSS-REFERENCE TO RELATED APPLICATIONS

Not applicable.

FIELD OF INVENTION

The present general inventive concept relates to an endpin for an upright stringed instrument, and, more particularly, to an automated endpin that can be automatically controlled to adjust to a desired length.

BACKGROUND

An upright stringed instrument such as a viola, cello, standup bass, etc., is designed to stand up on the floor or other such horizontal surface in an upright position when being played, as such instruments are far too large and unwieldy to be held by the player of the instrument. As such, these instruments are provided with endpins which support the instruments on the floor, both to prevent the bottom of the instrument from contacting the floor, and to allow an adjustable height of the instrument for differently sized players. Thus, whether the player of the instrument is standing or sitting next to the upright instrument, the height of the instrument can be adjusted to be more comfortably played by the player. However, conventional endpins typically require the user to lay the instrument down to adjust the length of the endpin, and thus the height of the instrument. Along with that, often the instrument will have to be laid down and adjusted multiple times, including standing the instrument back up between the various adjustments, before the desired height is actually found. The operation may then have to be reversed before the instrument is stored in a carrying case. This act of laying the instrument on its side, sometimes repeatedly, risks damage to the instrument, especially when done on rough surfaces.

FIGS. 1A-B illustrate a conventional endpin and upright instrument to which the conventional endpin is mounted. As illustrated in FIG. 1A, the conventional endpin 10 is typically formed with a sleeve 30 that is designed to be affixed to a bottom aperture in the upright stringed instrument 20 such that at least a portion of the sleeve 30 is inserted through the bottom aperture. FIG. 1B shows the endpin 10 mounted to the upright instrument 20. A sliding pin 40 is positioned in the sleeve 30 so as to be slidable up and down relative to the sleeve 30, and is held in a desired position by tightening a thumbscrew 50 provided in the sleeve. Thus, a user typically has to lay the instrument 20 down, loosen the thumbscrew 50, slide the sliding pin 40 to a position that the user thinks will be optimal, and then tighten the thumbscrew 50 to hold the sliding pin 40 in place before standing the instrument 20 back up. The sliding pin 40 will typically have to be retracted again at the end of the session, so that the instrument 20 can be placed back in an instrument case.

Besides the risk of damage to the instrument itself, it is very inconvenient to the user to have to repeatedly manipulate the instrument in this fashion, and loosening the set screw or thumbscrew of the endpin to adjust the length, and then tightening the set screw again. As the process may require several attempts, slippage must also be reckoned with, and a user almost always needs help, such as tools, to complete the process. Such a procedure is difficult for any player, but especially so for a player that may have physical limitations that hamper performing the task. In fact, tools are often needed to perform the height adjustment. Therefore, it would be desirable to have a more convenient way to adjust the height of such upright instruments.

BRIEF SUMMARY

According to various example embodiments of the present general inventive concept, an automatic endpin extension system is provided to allow a user to automatically adjust the length of the endpin to a desired position with the touch of a button. The endpin extension system of various example embodiments includes a motor driving a telescoping endpin to extend from, or retract into, the upright stringed instrument.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing an automatic endpin extension system to be used with an upright instrument, the system including a housing portion configured to be passed through a bottom aperture of an upright instrument, a coupling portion configured to be connected to the housing portion and to be coupled to the upright instrument proximate the bottom aperture, a telescoping endpin portion configured to be selectively moved up and down to extend out from, and withdraw into, the housing portion, a motor portion connected to the housing portion and configured to selectively drive the telescoping endpin portion up and down, and a controller portion configured to control the motor portion.

The foregoing and/or other aspects and advantages of the present general inventive concept may also be achieved by providing an automatic endpin extension system to be used with an upright instrument, the system including a housing configured to be passed through a bottom aperture of an upright instrument, a coupling member configured to be connected to the housing and to be coupled to the upright instrument proximate the bottom aperture, a telescoping endpin configured to be selectively moved up and down to extend out from, and withdraw into, a sleeve formed by the housing, a motor mounted proximate a top end of the housing and configured to selectively drive a leadscrew received in a top end of the telescoping endpin to move the telescoping endpin up and down relative to the housing, a controller configured to control the motor to drive the leadscrew in a selected direction, a remote control transmitter configured to be in wireless communication with the controller to control a direction in which the leadscrew is rotated, and a swivel base connected to a bottom end of the telescoping endpin and configured to allow a pivoting action of the telescoping endpin a certain number of degrees in any direction off of a vertical axis maintained by the swivel base.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1B:
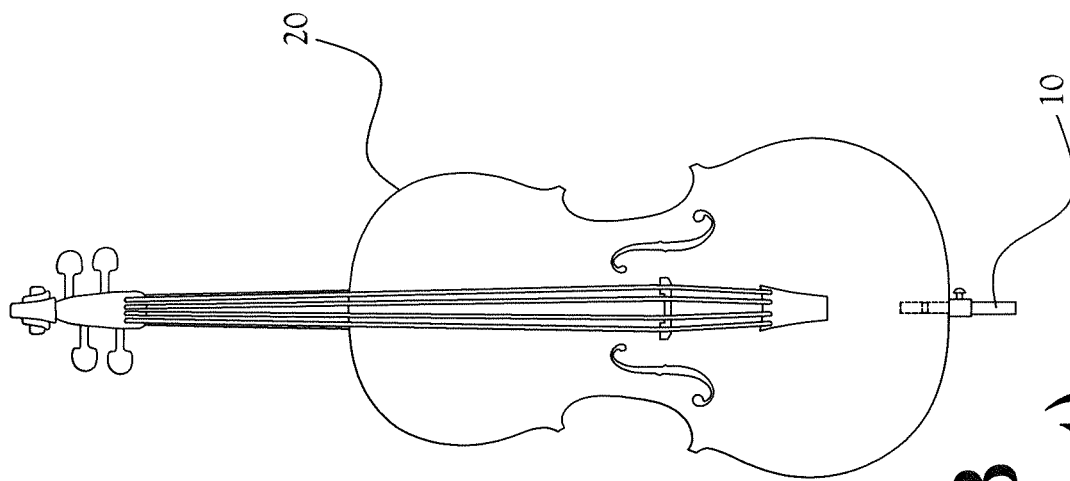
FIGS. 1A-B illustrate a conventional endpin and upright instrument to which it is mounted.
Figure 1A:
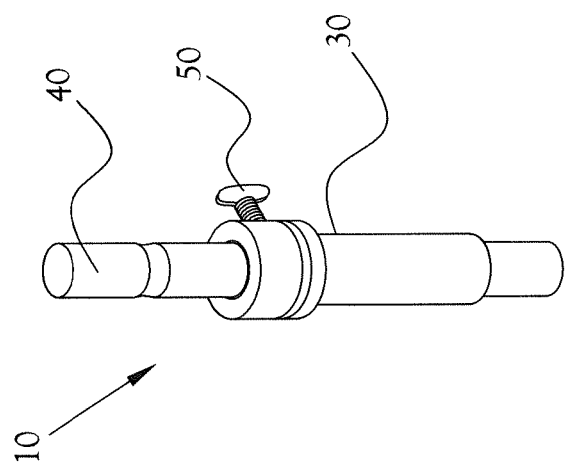

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, an automatic endpin extension system is provided to allow a user to automatically adjust the length of the endpin to a desired position with the touch of a button. The endpin extension system of various example embodiments includes a motor driving a telescoping endpin to extend from, or retract into, the upright stringed instrument. In the various example embodiments herein, any of a number of upright stringed instruments may be simply referred to as upright instruments.

Various example embodiments of the present general inventive concept provide an automatically adjustable endpin which allows for the vertical adjustment of the height of upright musical instruments by a powered motor, as opposed to the conventional, primitive manually operated endpins. Various example embodiments provide electric or electronic control to the motorized adjustment of the endpin height, thereby allowing complete ease of achieving the vertical height desired by the player of the instrument.

Figure 2:
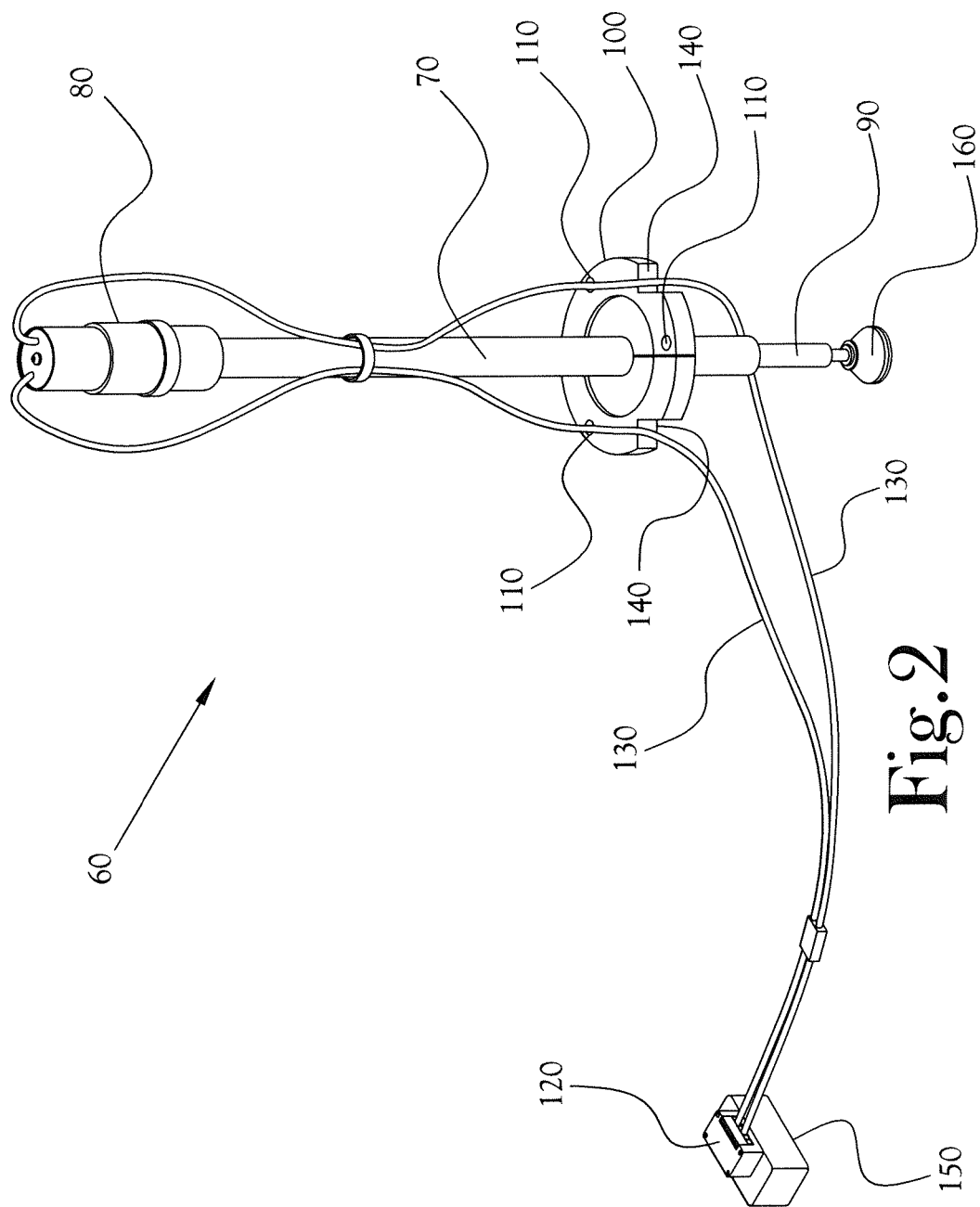
FIG. 2 illustrates a perspective view of an automatic endpin extension system according to an example embodiment of the present general inventive concept.

FIG. 2 illustrates a perspective view of an automatic endpin extension system according to an example embodiment of the present general inventive concept. As illustrated in FIG. 2, the automatic endpin extension system 60 includes a case or housing member or portion 70 with a motor 80 connected to the housing portion 70 proximate a top end of the housing portion 70. A telescoping endpin member or portion 90 is arranged at least partially inside the housing portion 70 such that a distal end of the telescoping endpin 90 can be selectively moved to be closer or farther away from a distal end of the housing 70. The motor 80 of this example embodiment is coupled to a proximal end of the telescoping endpin 90 such that the motor 80 drives the action of the telescoping endpin 90 to be moved further outside of the housing 70, to elevate the upright instrument higher off of the floor, and to be moved further inside the housing 70, to lower the upright instrument closer to the floor, or to withdraw the telescoping endpin 90 into the housing 70 for storage of the instrument. A coupling member or portion 100 is arranged to hold the housing portion 70 in place relative to thee upright instrument. In various example embodiments the coupling portion 100 may be integrally formed with the housing portion 70, and in various example embodiments the coupling portion 100 may be configured to hold the housing portion 70 by, for example, a friction fit between the coupling portion 100 and the housing portion 70. The coupling portion 100 is configured to be attached to a bottom of the upright instrument proximate a bottom aperture of the upright instrument that is formed to pass an endpin therethrough. In the example embodiment illustrated in FIG. 2, the coupling portion 100 is formed to surround an outer diameter of the housing portion 70, and is provided with a number of screw holes 110 to allow the attachment of the coupling portion 100 to the bottom of the upright instrument. The housing portion 70 and motor 80 of this example embodiment are configured so as to be passed through the bottom aperture of the upright instrument, which may be bored to a larger diameter than a conventional bottom aperture so as to pass the housing 70 and motor 80 assembly therethrough. Thus, an advantage of the example embodiment of the present general inventive concept illustrated in FIG. 2 is that a user may conveniently retrofit the system 60 to an upright instrument using the existing bottom endpin aperture, or may bore the existing bottom endpin aperture to a larger diameter to pass the housing 70 and motor 80 assembly therethrough, and the coupling portion 100 can be used to fix the housing 70 in place be being attached to the bottom of the upright instrument. The coupling portion 100 illustrated in FIG. 2 is configured to cover the bottom aperture of the upright instrument, and may have a host of different configurations aside from that illustrated in FIG. 2.

In the example embodiment illustrated in FIG. 2, a swivel base 160 is connected to the distal end of the telescoping pin 90 such that the system has a base on which to stand, and which allows the system 60, and therefore the upright instrument attached thereto, to be pivoted to a plurality of different angles for the convenience of the person playing the instrument.

As illustrated in this example embodiment, the motor 80 is in electrical communication with a controller portion or controller 120 by electrical wires 130 passing through openings 140 formed in the coupling portion 100. A battery or battery housing generally denoted by identifier 150 supplies power to the motor 80, which may be passed through and/or controlled by the controller 120 to cause the motor 80 to drive the telescoping endpin 90 in the up or down direction, and may be used to control the motor 80 to hold a current position. While the controller 120 and battery 150 are illustrated as separate housings in the example embodiment illustrated in FIG. 2, in various example embodiments other configurations may be employed, such as a single housing for both the controller circuitry and the battery. The battery or controller/battery housing may allow rechargeable or non-rechargeable batteries to be removably installed therein, and various example embodiments may provide a charging port to allow convenient recharging of the battery located inside. In various example embodiments the controller 120 may be provided with a user switch that causes the controller 120 to control the motor 80 to move the telescoping endpin 90 up and down. In other various example embodiments the system 60 may be provided with a remote control, such as a handheld fob or smartphone app, that communicates wirelessly with the controller 120 in place of, or along with, such a user switch provided on the controller 120.

Figure 3:
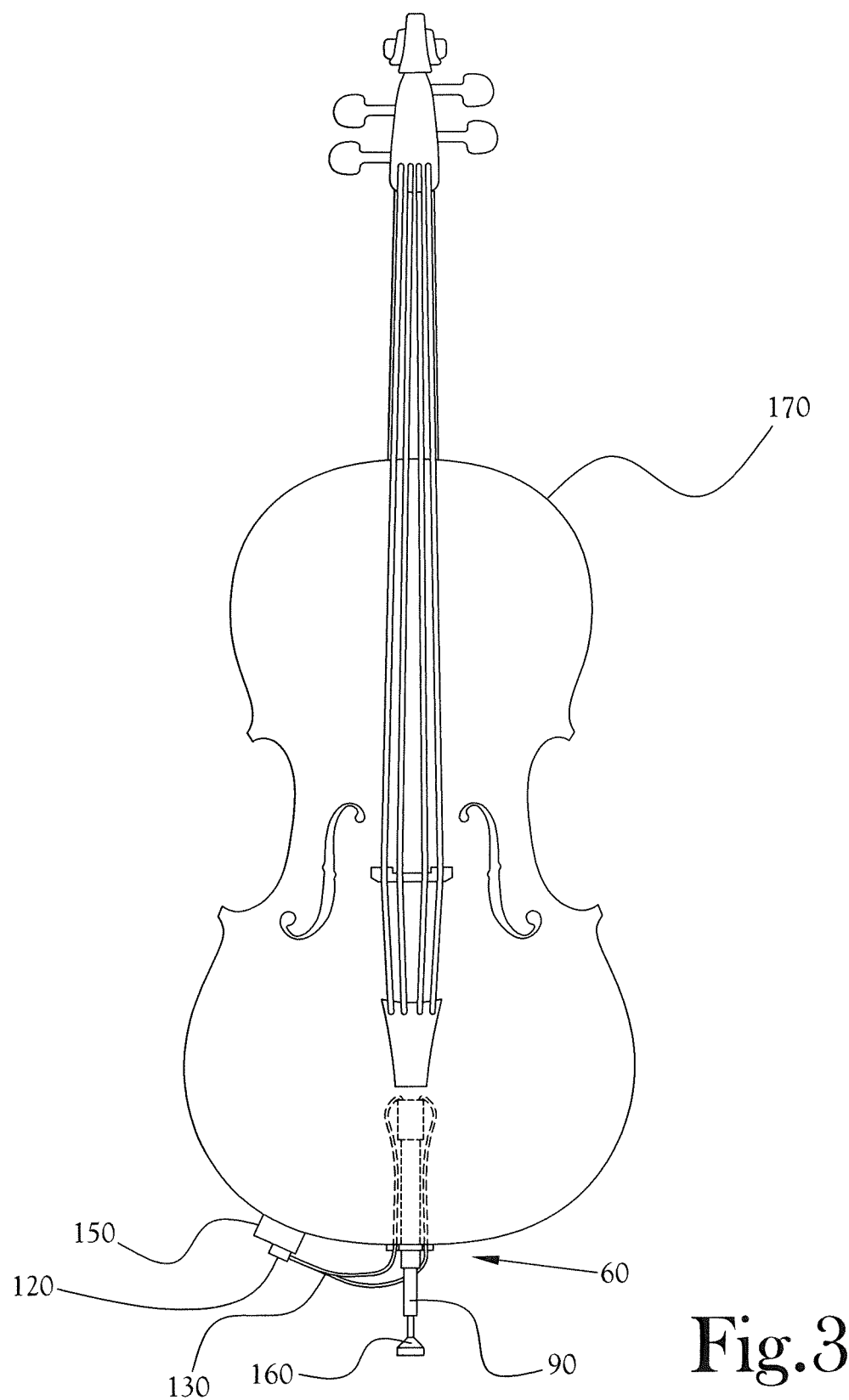
FIG. 3 illustrates an upright instrument equipped with the automatic endpin extension system of FIG. 2.

FIG. 3 illustrates an upright instrument 170 equipped with the automatic endpin extension system 60 of FIG. 2. As illustrated in FIG. 3, the housing portion 70 and motor 80 assembly have been passed through the bottom aperture of the upright instrument 170, and the coupling portion 100 has been affixed to the bottom of the upright instrument 170. In this example embodiment, a bottom of the housing 70 extends partially below the coupling portion 100, and the telescoping endpin 90 extends out of the housing 70 with the swivel base 160 attached to the distal end. Various example embodiments of the present general inventive concept may include telescoping endpins without such a swivel base provided thereto, or may include a swivel base assembly that is selectively removable from the telescoping endpin 90. In this example embodiment, the controller 120 and battery 150 are attached to a bottom surface of the upright instrument 170 so as to be relatively out of sight to observers. In various example embodiments the controller 120 and/or battery 150 may be attached to a variety of other locations, and may be removably attached by an adhesive elements such as VELCRO® so as to provide easy removal of those components if desired. In various example embodiments in which the controller is in configure to operate in wireless communication with a remote control unit held by the user, the controller may be arranged on the housing 70 or motor 80 inside the upright instrument 170, with the battery 150 still being located outside the instrument for convenient charging and/or replacement. Thus, with a simple touch of a button, such as a directional button provided on or to the controller 120, or on a remote control unit, a user can easily raise or lower the telescoping endpin 90 to a point that an optimal height of the upright instrument 170 is provided to the user. In various example embodiments of the present general inventive concept, the motor 80 may be power rated such that the upright instrument 170 can be raised or lowered even while being supported by the telescoping endpin 90, for added convenience to the user.

Figure 4A:
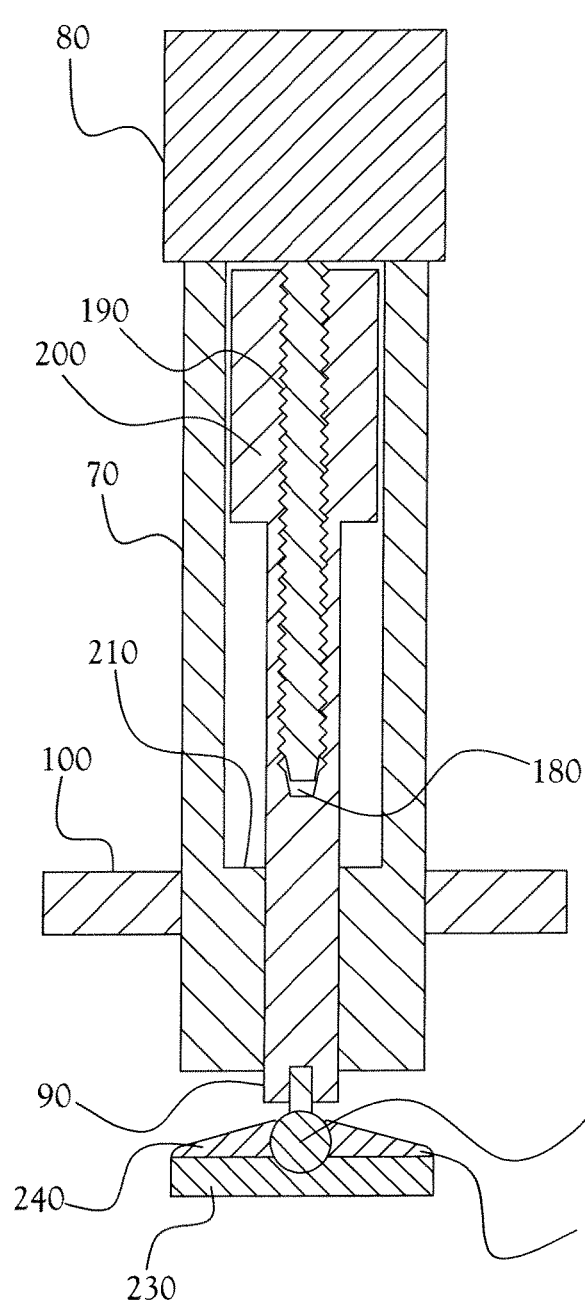
FIGS. 4A-B illustrate a cross-section of a telescoping endpin portion of an automatic endpin extension system according to an example embodiment of the present general inventive concept.
Figure 4B:
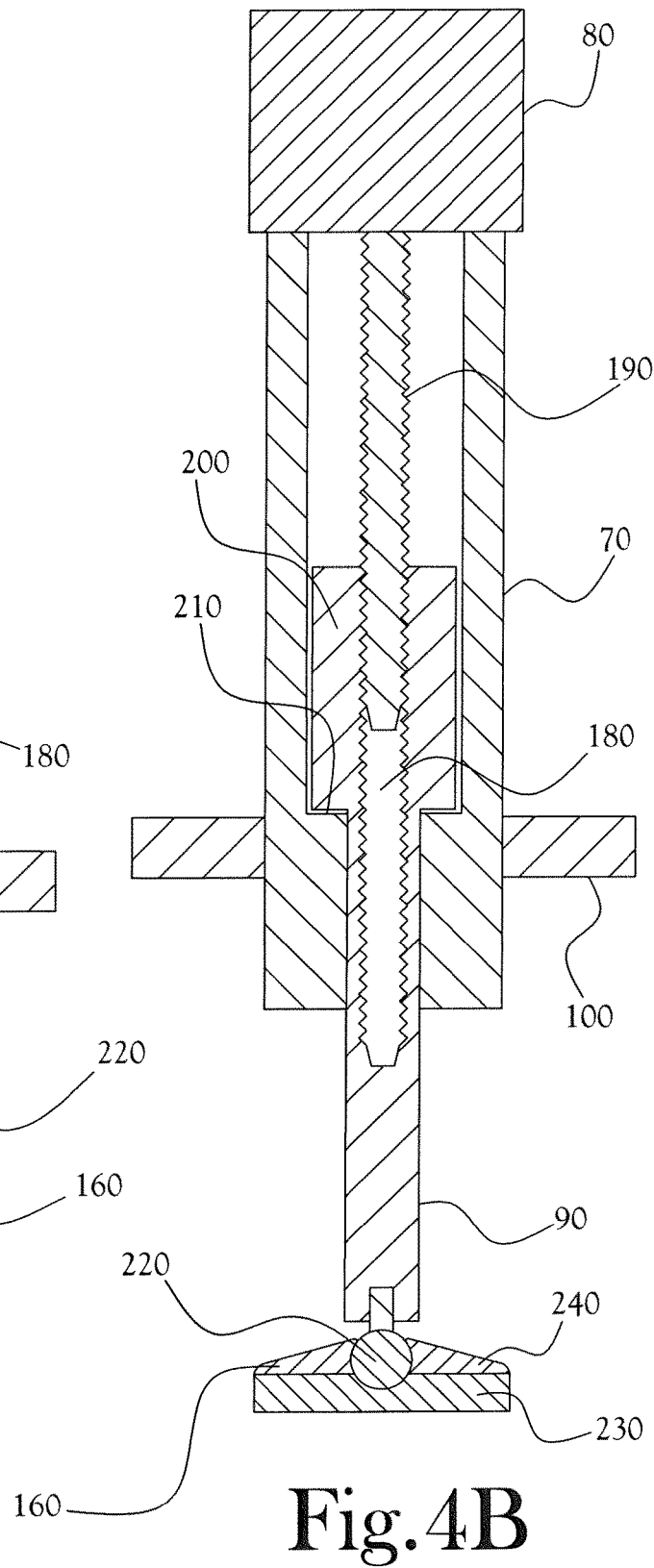
Figure 5:
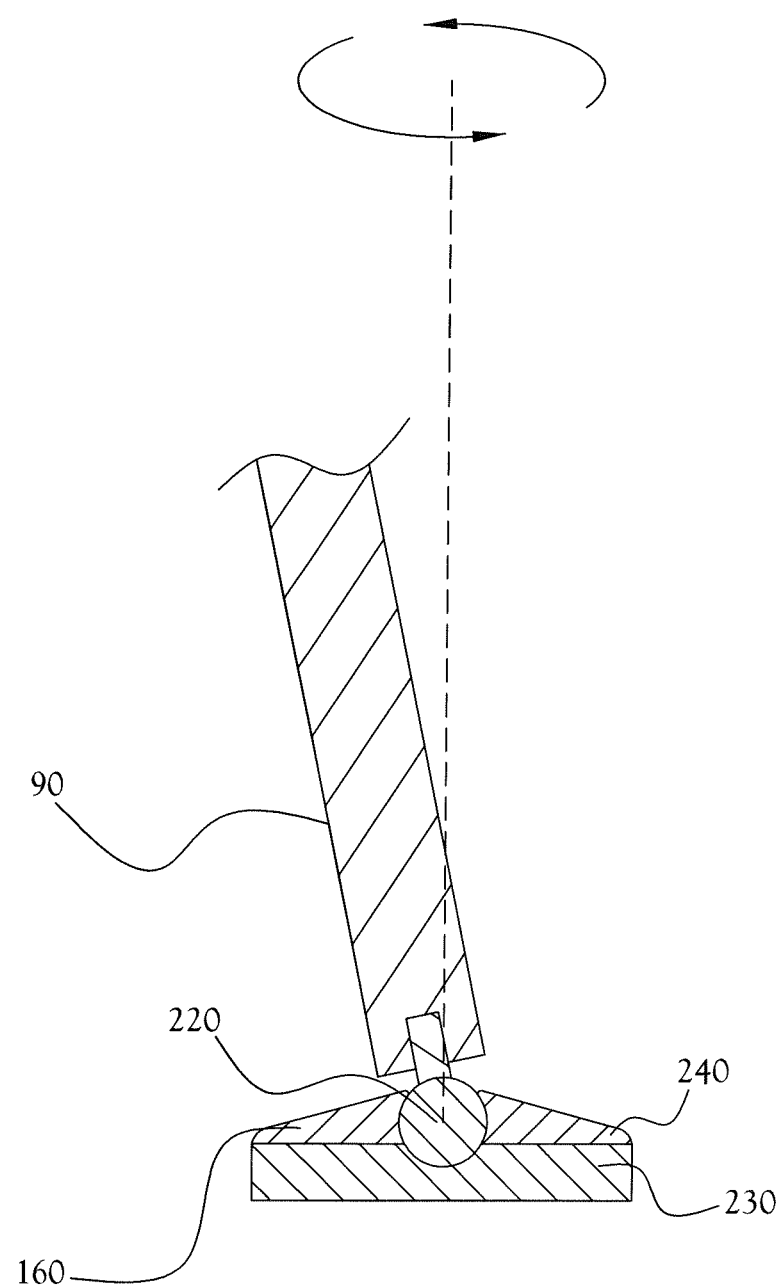
FIG. 5 illustrates a cross-section of the base portion of FIG. 4 with the telescoping endpin pivoted to an angle for use during playing of an upright instrument.

FIGS. 4A-B illustrate a cross-section of a telescoping endpin portion of an automatic endpin extension system according to an example embodiment of the present general inventive concept. While various example embodiments of the present general inventive concept may provide a host of differently configured linear actuators to selectively extend and withdraw a telescoping endpin, the example embodiment illustrated in FIGS. 4A-4B show an example configuration such as that illustrated in FIGS. 2-3. FIG. 4A illustrates the telescoping endpin 90 in a fully withdrawn state, and FIG. 4B illustrates the telescoping endpin 90 in a fully extended state. It is understood that the size and configuration of these components have been simplified for ease of understanding, and that much more range of motion may be available in various example embodiments of the present general inventive concept. As illustrated in FIGS. 2A-B, the telescoping endpin 90 is configured with a threaded opening 180 provided through a top end thereof, the threaded opening 180 being formed to receive a jackscrew or leadscrew 190 that is coupled to the motor 80 such that rotation of the leadscrew 190 in one direction causes the telescoping endpin 90 to move in a downward direction to extend at least partially out of the sleeve or housing portion 70, and rotation of the leadscrew 190 in the other direction causes the telescoping endpin 90 to move in an upward direction to withdraw at least partially into the sleeve or housing portion 70. Although not illustrated, and as is known in the field of linear actuators, an outer surface of the telescoping endpin 90 may be slidably connected to an inner surface of the housing 70 so as to prevent rotation of the telescoping endpin 90 during rotation of the leadscrew 190. For example, a projection extending along a length of the outer surface of the telescoping endpin 90 may be received in a groove extending along a length of the inner surface of the housing 70 in a sliding arrangement so that the telescoping endpin 90 is able to move up and down, but not rotate. In various example embodiments, as illustrated in FIGS. 4A-B, the telescoping endpin 90 may have a flange 200 formed proximate a top end thereof that abuts an inner surface ledge 210 formed in the housing 70 to prevent the telescoping endpin 90 from moving past a certain point in the downward direction, and that abuts a top inner surface ledge or the motor 80 housing to prevent the telescoping endpin 90 from moving past a certain point in the upward direction. In this example embodiment, the swivel base 160 forms a ball and socket connection with a ball or ball point 220 arranged at a distal or bottom end of the telescoping endpin 90, so that the telescoping endpin 90 is rotatable a certain number of degrees away from a vertical axis that passes through the swivel base 160 when the swivel base 160 is resting on a flat floor or other surface. FIG. 5 illustrates a cross-section of the swivel base portion of FIG. 4 with the telescoping endpin 90 pivoted to an angle for use during playing of an upright instrument. In various example embodiments the swivel base may be formed with a bottom portion 230 that has a substantially flat bottom surface to rest on the floor, and a top portion 240 that operates in conjunction with the bottom portion 230 to hold the ball point 220 in place in a pivotable arrangement. The bottom portion 230 may be provided with different surfaces according to a preference of a user, such as a felt covering to protect a floor on which the swivel base 160 rests, or a non-skid covering to help hold the swivel base 160 in place, and so on. In various example embodiments the ball point 220 may be a separate portion that is selectively removable from the bottom end of the telescoping endpin 90 so that a user can change out the tip of the telescoping endpin 90 when a sharp point or other such end arrangement is preferred. The ball point 220 and other replacement points may be coupled to a bottom end of the telescoping endpin 90 by, for example, a screw in arrangement, or may have a male-female coupling held in place with set screws passing through from an outer surface proximate a bottom end of the telescoping endpin 90, and so on.

Figure 6:
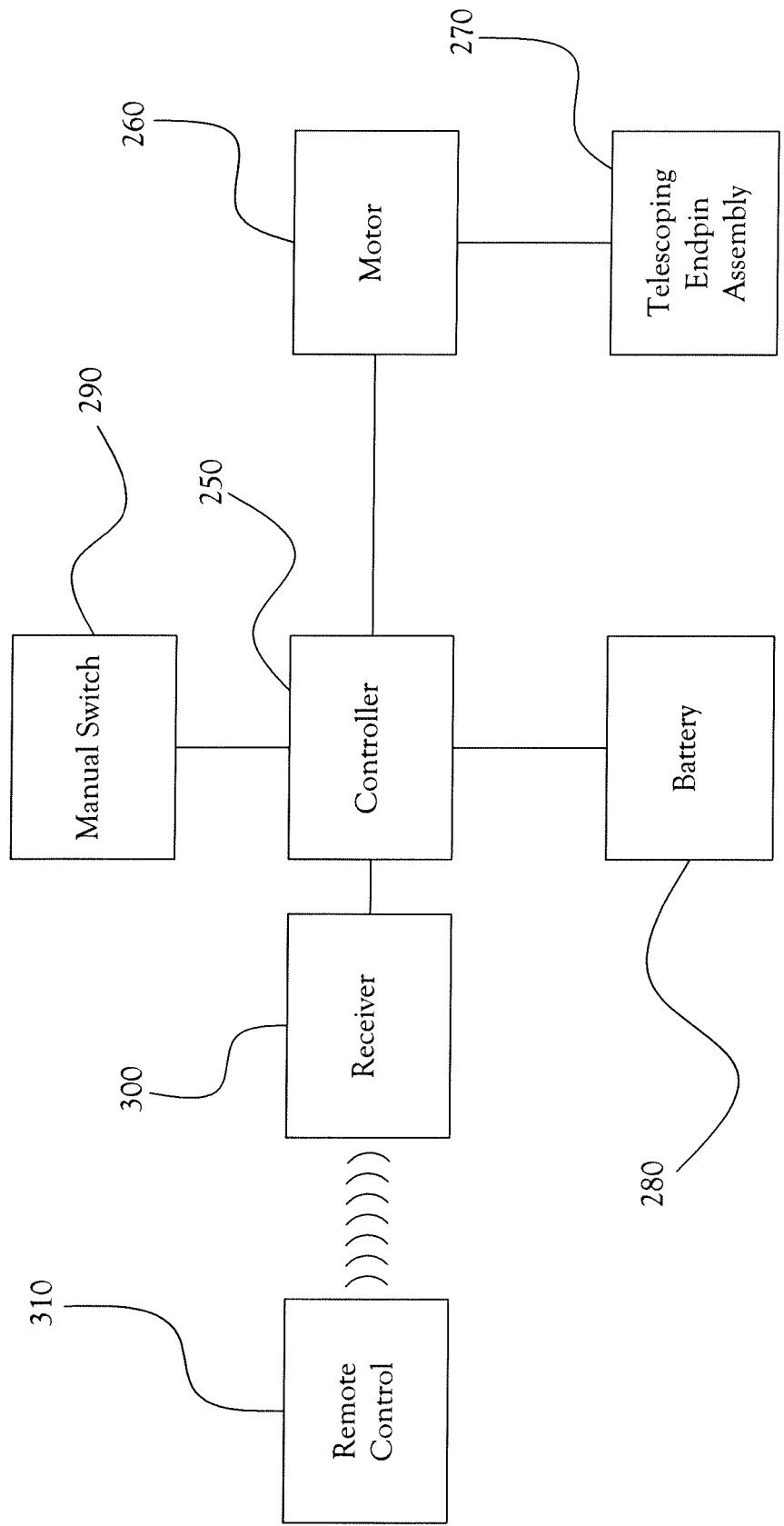
FIG. 6 is a block diagram illustrating an automatic endpin extension system according to an example embodiment of the present general inventive concept.

FIG. 6 is a block diagram illustrating an automatic endpin extension system according to an example embodiment of the present general inventive concept. As illustrated in the example embodiment of FIG. 6, a controller 250 is configured to control operation of a motor 260 that drives a telescoping endpin assembly 270 to move a telescoping endpin up and down to a desired position. A battery 280 provides power, either through the controller 250 or direction to the motor 260, and the direction of the motor 260 drive is controlled by the controller 250 according to a manual switch 290 operated by a user of the system, and/or by a remote control 310 that transmits a wireless directional signal that is received by a receiver 300 in communication with the controller 250. The motor 260 may be configured to hold the power drive in place by use of a clutch or other mechanism so that the telescoping endpin is held static when not being adjusted up or down. The controller 250 may also be configured to control a charging operation for the battery 280.

In various example embodiments the battery may be a 12 volt NiCad battery. The motor may be configured with a gearhead to turn the screw drive. In various example embodiments the motor may be rated to lift approximately 50 pounds and sustain linearly on up-down axis for 4" or more movement. In various example embodiments the control unit may be configured to be mounted around the endpin or housing, and may be fixed to the mounting plate or coupling portion for a more aesthetically pleasing appearance. Similarly, the battery or battery pack may also be mounted to a portion of the assembly just outside the body of the upright instrument, and may be easily detachable for convenience when not in use. In various example embodiments the motor may be rated so as to be able to adjust the height of the upright instrument even while the instrument is in use. In various example embodiments the controller or controller unit may include an electronic board having a receiver remote, a motor drive, a charger battery, a lithium battery, and so on. In various example embodiments the user control could include a toggle switch, which may be mounted near a top of the body of the upright instrument, and may have an aperture cut in the body to have power and/or control wires connected to the motor. The remote control could in some embodiments be a key fob transmitter, matched to a receiver unit of the controller, and may have a power distance of 10 yards. The swivel base may be a two-piece assembly configured to capture a 0.5" ball at the end of a 0.3" pin member. The top and bottom pieces of the swivel base may be screwed together. The swivel base may be configured to allow a 30 degree tilt off the centerline around 360 degree axis of the instrument. The swivel base in some embodiments may feature a four part precision machined assembly that prevents "digging in" and marring the floor and other surfaces. Further feature could include a rubber tip that prevents scooting of the endpin. In some example embodiments the system could be included in an easy installation kit that would need just a few basic tools to implement. Installation of the system with such a prepared kit could readily be accomplished by a person who has only basic skills with hand tools.

Various example embodiments of the present general inventive concept provide a sturdy and self-contained motorized endpin, and some of the components may be fabricated from aircraft grade 2024-T6 aluminum. The motor may be a 12V rated motor connected to the machine by a precision clutch gearbox. The machine may be actuated for up/down movement by a remote control device similar to a key fob. In various example embodiments, such a motorized device may be retro-fitted onto an existing endpin aperture after reaming the aperture to accommodate the outer diameter of the device. An electronic switchbox may be mounted to the instrument in a convenient location by, for example, VELCRO® strips. The extension machine member, which may be a linear actuator, and which may be constructed with aircraft grade aluminum, may be power driven by a NiCad rechargeable batter of 2.4 volts, recharging of which may be easily accomplished by insertion of a pin recharger into a conveniently located aperture on a control box or battery pack detachably attached to the body of the instrument. In various example embodiments the battery may be replaced as needed by, for example, opening a battery cover and removing the existing battery from the battery pack, and inserting the replacement battery within. The battery cover may be secured by a securing member such as a screw nut. The extension mechanism may include a clutch gear drive assembled with planetary gears, matched accurately to the drive motor, and power may be introduced to the extension mechanism by way of a hexagonal female coupling matched to the male drive of the device and all secured by the connection case.

Such a system may be valuable to many people in the music field. For example, more and more women are playing the standup bass, or bass fiddle, especially in the ever-popular bluegrass music field. An adjustment of the instrument height may be needed when the female player switches from flat to high-heeled shoes, or from flat to hilly terrain. With systems according to the present general inventive concept, such a player can easily adjust the height to the desired level with a simple push of a button.

Various example embodiments of the present general inventive concept may provide a precision machined, self-contained, rigid device that includes a gear driven clutch assembly, powered by a high-tech mini motor. Various electronics may include state-of-the-art printed circuit boards, rechargeable batteries, and an easy touch remote "up & down" switch. Such a system may be easily installed, and may fit into an existing endpin aperture after a bit of reaming to accommodate the outside diameter of the device. Various example embodiments of the device/system do not have to be disassembled to install the device, when done as a modification. Various advantages of systems configured according to the present general inventive concept are limitless due to the rising value of vintage instruments, and also the rising cost of new instruments. By not having to lay the instrument down to adjust the height of the instrument, a large percentage of wear and tear is eliminated, thereby adding years of life to the instrument.

Various example embodiments of the present general inventive concept may provide an automatic endpin extension system to be used with an upright instrument, the system including a housing portion configured to be passed through a bottom aperture of an upright instrument, a coupling portion configured to be connected to the housing portion and to be coupled to the upright instrument proximate the bottom aperture, a telescoping endpin portion configured to be selectively moved up and down to extend out from, and withdraw into, the housing portion, a motor portion connected to the housing portion and configured to selectively drive the telescoping endpin portion up and down, and a controller portion configured to control the motor portion. The motor portion may be mounted to the housing portion proximate an upper end of the housing portion. The system may further include a battery in electrical communication with the motor portion to provide power to the motor portion. The battery may be rechargeable. The system may further include a battery case configured to be attached to an outer surface of the upright instrument and to at least partially encase the battery therein. The battery case may be provided with a charging portion configured to be selectively connected to an external power supply to charge the battery. The controller may include a directional switch in electrical communication with the controller and configured to cause the controller to move the telescoping endpin portion up and down, the controller and directional switch being configured to be connected to the battery case. The system may further include a remote control configured to be in electrical communication with the controller and configured to cause the controller to move the telescoping endpin portion up and down. The system may further include a remote control receiving unit in electrical communication with the controller and configured to receive endpin directional signals from the remote control. The system may further include a leadscrew rotationally secured within the housing and configured to be rotated bidirectionally by the motor portion, wherein an upper end of the telescoping endpin portion may be formed with a threaded receiving portion configured to receive at least a portion of the leadscrew at a distal end of the leadscrew such that rotation of the leadscrew in a first direction causes the telescoping endpin portion to move downward, and rotation of the leadscrew in a second direction causes the telescoping endpin portion to move upward. The motor portion may be configured to control the leadscrew so as to maintain a current position in absence of a control signal to move the telescoping endpin portion up or down. At least a portion of an outer surface of the telescoping endpin portion may be slidably connected to an inner portion of the housing portion to prevent rotation of the telescoping endpin portion. The coupling portion may be configured surround the outer diameter of the housing portion, and to be connected to the upright instrument at a plurality of locations about the bottom aperture. The coupling portion may be configured to be selectively clamped to an outer surface of the housing portion such that the housing portion can be selectively positioned relative to the coupling portion. The coupling portion may be formed with at least one through opening configured to pass electrical wires from a battery through to the motor portion inside the upright instrument. The system may further include a base portion configured to be coupled to a distal end of the telescoping endpin portion such that the telescoping endpin portion is pivotable relative to the base portion, wherein a flat bottom surface of the base portion may remain resting on a floor while the upright instrument is leaned to a desired angle. The distal end of the telescoping endpin portion may be provided with a ball that is rotatable captured in the base portion to form a ball and socket connection. The base portion and/or the ball of the telescoping end portion may be configured to be selectively removable from the telescoping endpin portion.

Various example embodiments of the present general inventive concept may provide an automatic endpin extension system to be used with an upright instrument, the system including a housing configured to be passed through a bottom aperture of an upright instrument, a coupling member configured to be connected to the housing and to be coupled to the upright instrument proximate the bottom aperture, a telescoping endpin configured to be selectively moved up and down to extend out from, and withdraw into, a sleeve formed by the housing, a motor mounted proximate a top end of the housing and configured to selectively drive a leadscrew received in a top end of the telescoping endpin to move the telescoping endpin up and down relative to the housing, a controller configured to control the motor to drive the leadscrew in a selected direction, a remote control transmitter configured to be in wireless communication with the controller to control a direction in which the leadscrew is rotated, and a swivel base connected to a bottom end of the telescoping endpin and configured to allow a pivoting action of the telescoping endpin a certain number of degrees in any direction off of a vertical axis maintained by the swivel base. The swivel base may be configured as a ball and socket joint that is selectively attached and detached to the bottom end of the telescoping endpin.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:
1. An automatic endpin extension system to be used with an upright instrument, the system comprising:
 a housing portion configured to be passed through a bottom aperture of an upright instrument;
 a coupling portion configured to be connected to the housing portion and to be coupled to the upright instrument proximate the bottom aperture;

a telescoping endpin portion configured to be selectively moved up and down to extend out from, and withdraw into, the housing portion;

a motor portion connected to the housing portion and configured to selectively drive the telescoping endpin portion up and down; and a controller portion configured to control the motor portion.

2. The system of claim 1, wherein the motor portion is mounted to the housing portion proximate an upper end of the housing portion.

3. The system of claim 1, further comprising a battery in electrical communication with the motor portion to provide power to the motor portion.

4. The system of claim 3, wherein the battery is rechargeable.

5. The system of claim 3, further comprising a battery case configured to be attached to an outer surface of the upright instrument and to at least partially encase the battery therein.

6. The system of claim 5, wherein the battery case is provided with a charging portion configured to be selectively connected to an external power supply to charge the battery.

7. The system of claim 5, wherein the controller comprises a directional switch in electrical communication with the controller and configured to cause the controller to move the telescoping endpin portion up and down, the controller and directional switch being configured to be connected to the battery case.

8. The system of claim 1, further comprising a remote control configured to be in electrical communication with the controller and configured to cause the controller to move the telescoping endpin portion up and down.

9. The system of claim 8, further comprising a remote control receiving unit in electrical communication with the controller and configured to receive endpin directional signals from the remote control.

10. The system of claim 1, further comprising:
a leadscrew rotationally secured within the housing and configured to be rotated bidirectionally by the motor portion;
wherein an upper end of the telescoping endpin portion is formed with a threaded receiving portion configured to receive at least a portion of the leadscrew at a distal end of the leadscrew such that rotation of the leadscrew in a first direction causes the telescoping endpin portion to move downward, and rotation of the leadscrew in a second direction causes the telescoping endpin portion to move upward.

11. The system of claim 10, wherein the motor portion is configured to control the leadscrew so as to maintain a current position in absence of a control signal to move the telescoping endpin portion up or down.

12. The system of claim 10, wherein at least a portion of an outer surface of the telescoping endpin portion is slidably connected to an inner portion of the housing portion to prevent rotation of the telescoping endpin portion.

13. The system of claim 1, wherein the coupling portion is configured surround the outer diameter of the housing portion, and to be connected to the upright instrument at a plurality of locations about the bottom aperture.

14. The system of claim 13, wherein the coupling portion is configured to be selectively clamped to an outer surface of the housing portion such that the housing portion can be selectively positioned relative to the coupling portion.

15. The system of claim 13, wherein the coupling portion is formed with at least one through opening configured to pass electrical wires from a battery through to the motor portion inside the upright instrument.

16. The system of claim 1, further comprising:
a base portion configured to be coupled to a distal end of the telescoping endpin portion such that the telescoping endpin portion is pivotable relative to the base portion;
wherein a flat bottom surface of the base portion can remain resting on a floor while the upright instrument is leaned to a desired angle.

17. The system of claim 16, wherein the distal end of the telescoping endpin portion is provided with a ball that is rotatable captured in the base portion to form a ball and socket connection.

18. The system of claim 17, wherein the base portion and/or the ball of the telescoping end portion are configured to be selectively removable from the telescoping endpin portion.

19. An automatic endpin extension system to be used with an upright instrument, the system comprising:
a housing configured to be passed through a bottom aperture of an upright instrument;
a coupling member configured to be connected to the housing and to be coupled to the upright instrument proximate the bottom aperture;
a telescoping endpin configured to be selectively moved up and down to extend out from, and withdraw into, a sleeve formed by the housing;
a motor mounted proximate a top end of the housing and configured to selectively drive a leadscrew received in a top end of the telescoping endpin to move the telescoping endpin up and down relative to the housing;
a controller configured to control the motor to drive the leadscrew in a selected direction;
a remote control transmitter configured to be in wireless communication with the controller to control a direction in which the leadscrew is rotated; and
a swivel base connected to a bottom end of the telescoping endpin and configured to allow a pivoting action of the telescoping endpin a certain number of degrees in any direction off of a vertical axis maintained by the swivel base.

20. The system of claim 19, wherein the swivel base is configured as a ball and socket joint that is selectively attached and detached to the bottom end of the telescoping endpin.

* * * * *